April 1, 1941.    H. R. RICARDO    2,236,950
TWO-STROKE INTERNAL COMBUSTION ENGINE OPERATING
WITH COMPRESSION IGNITION
Filed Nov. 1, 1939    4 Sheets-Sheet 3

Inventor
Harry R. Ricardo
By Watson, Cole, Grindle & Watson
Attys

Inventor
Harry R. Ricardo
By Watson, Cole, Grindle & Watson
Att'ys

Patented Apr. 1, 1941

2,236,950

UNITED STATES PATENT OFFICE 2,236,950

TWO-STROKE INTERNAL COMBUSTION ENGINE OPERATING WITH COMPRESSION IGNITION

Harry Ralph Ricardo, London, England

Application November 1, 1939, Serial No. 302,412
In Great Britain October 13, 1938

3 Claims. (Cl. 123—32)

This invention relates to two-stroke internal combustion engines operating with compression ignition and having tangential piston-controlled ports in the cylinder wall and in the head of the cylinder a combustion chamber, into which at the end of the compression or in-stroke of the piston there is forced substantially the whole of the air charge, that is to say as much of this air charge as mechanical considerations permit exhaust gases being discharged through a valve controlled port in the combustion chamber.

It is an object of the invention to effect improvement in the operation of engines of the type described, especially with a view to the attainment of more complete combustion of fuel therein.

An important feature of the invention is the association with the mouth of the combustion chamber of a heat storing lip or flange, the arrangement being such that the burning charge flows under this lip both during the period of expansion of the charge following ignition thereof, and during the subsequent period in which the charge is released from the cylinder. It is found that such an arrangement materially improves combustion and is peculiarly effective in minimizing the objectionable odor of exhaust gas issuing from the engine.

While the heat storing lip or flange may be formed integrally with the combustion chamber, it is preferably constituted by a separate plug which may be heat insulated from the cylinder head and chamber to the extent desired.

Figure 1:
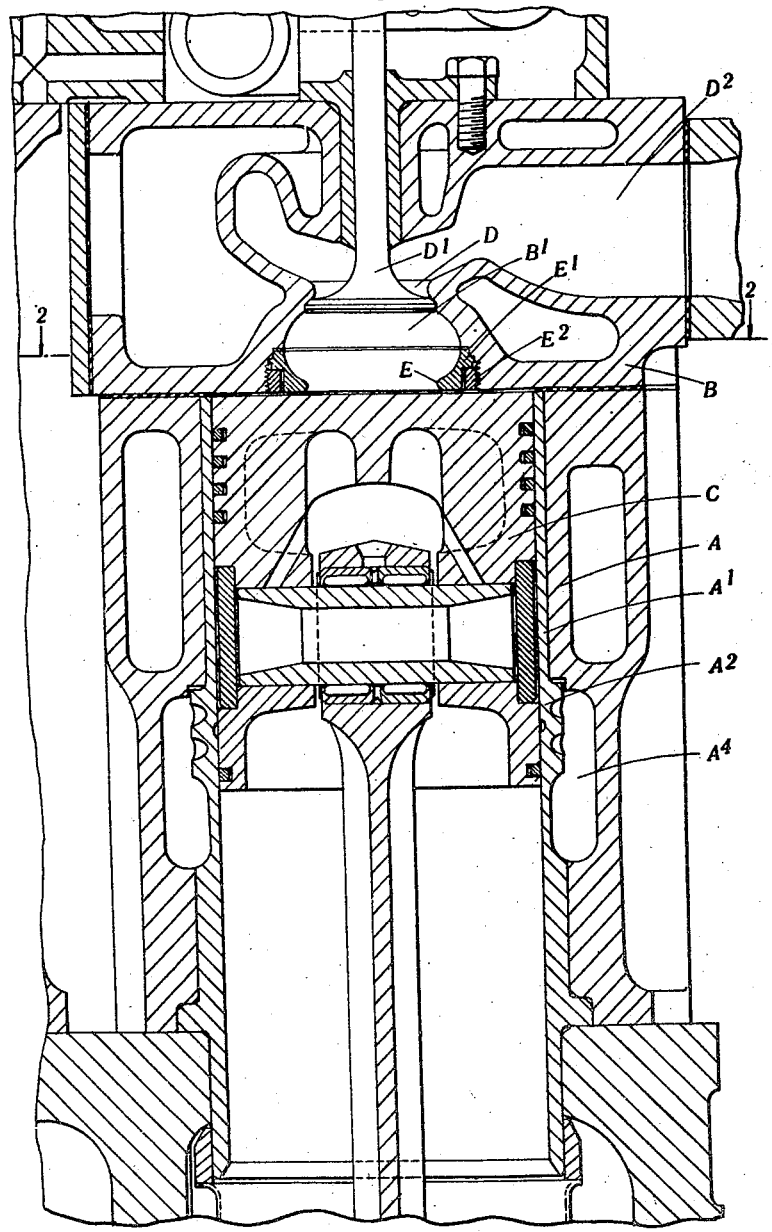
Figure 2:
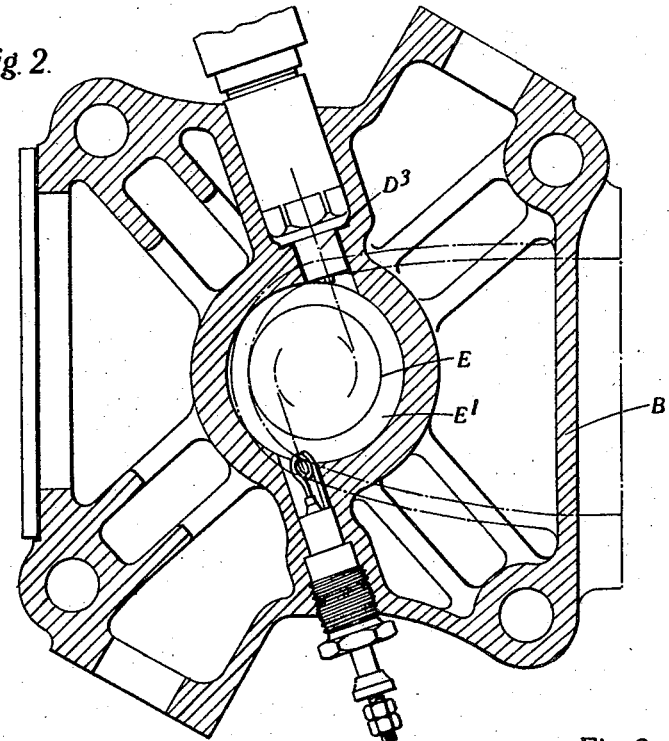
Figure 3:
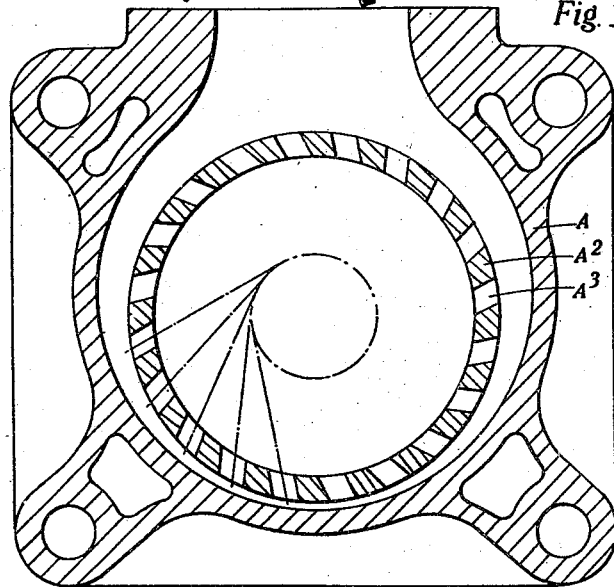

Various constructions according to the invention are illustrated by way of example in the accompanying drawings, in which Figure 1 is a sectional elevation of the cylinder, cylinder head and piston of one construction according to the invention, Figure 2 is a section on the line 2—2 of Figure 1, Figure 3 is a section on the line 3—3 of Figure 1, and Figures 4, 5, 6 and 7 show in sectional elevation modified constructions according to the invention.

In the construction illustrated in Figures 1, 2 and 3, the engine comprises a water-cooled cylinder A provided with a liner $A^1$ and closed at its upper end by a cylinder head B. The under face of the cylinder head B is flat, as shown, and a piston C reciprocating within the liner has a correspondingly flat piston head, the stroke of the piston being such that at the end of the compression stroke the piston head approaches the cylinder head with only such clearance as is reasonably required for mechanical purposes.

Formed in the liner is a thickening $A^2$, in which are formed a series of tangential inlet ports $A^3$ communicating with a scavenging belt $A^4$ and arranged to be uncovered by the piston at or towards the end of its out-stroke.

Formed centrally in the cylinder head B is a combustion chamber $B^1$, into which the major part of the air charge is thus forced by the piston at the end of the compression stroke. The combustion chamber $B^1$ is provided at its upper end with a central exhaust port D controlled by a poppet valve $D^1$ and communicating with an exhaust passage $D^2$ in the cylinder head, while the lower end of the combustion chamber communicates with the cylinder through a "mouth" constituted by a lip E. The internal contour of the combustion chamber is a figure of revolution about the cylinder axis, the side wall having a smooth curvature extending from the exhaust port D to the "mouth" or lip E. As will be seen, the maximum diameter of the combustion chamber is greater than the diameter of the exhaust port D and greater than the minimum diameter of the "mouth" E and the latter is not less than the diameter of the exhaust valve $D^1$. Thus, the minimum diameter of the "mouth" E should be of the order of 0.73 to 0.9 of the maximum diameter of the combustion chamber, while the depth of the chamber measured in the direction of its axis and between the lower face of the exhaust valve $D^1$ when closed and the plane in which lies the actual orifice of the mouth E is of the order of 0.4 to 0.45 of the maximum diameter of the combustion chamber.

As will be seen, the lower part of the combustion chamber is formed in and by a plug $E^1$ carrying the lip E forming the mouth, this plug being retained in place by a screw-threaded ring $E^2$ acting through a shoulder on the plug to hold this plug against a suitable seating in the cylinder head. The plug is preferably formed so that it has limited contact with the ring $E^2$ and with the cylinder head, so that it is to a considerable extent heat-insulated from the cylinder head.

As will be seen from Figure 2, the fuel injector $D^3$ is arranged in the cylinder head at one side of the combustion chamber and so that the axis of the fuel jet lies in a plane normal to the axis of the chamber and tangential to a circle whose centre is on the chamber axis. The diameter of this circle is conveniently approximately half the maximum diameter of the chamber. If desired, the axis of the injector may have a small downward angular component towards the face of the cylinder head. This inclination, however, is only called for by reason of the necessary proximity of the injector mounting to the face of the head, this being due to the general dimensions and more especially to the depth of the combustion chamber. In such an arrangement the inclination of the axis of the injector causes the fuel jet to be directed towards a part of the wall of the chamber which lies within the lip E and between the latter and the transverse plane in which the maximum diameter of the chamber lies.

Considered in relation to the direction of swirl or rotation of the air charge caused by its tangential entry through the ports $A^3$, the fuel is injected in the same tangential direction, that is to say in a direction which may be termed "downstream" with respect to the general rotation of the air charge not only in the cylinder, but in the combustion chamber, since this rotational movement persists after the air charge has been forced into the combustion chamber.

It is generally preferred that the exhaust valve $D^1$ should be of the type commonly known as "masked," that is to say the valve seat is set back in a cylindrical recess formed in the part around the port D, and the periphery of the valve adjacent to its outer face is cylindrical and fixed with suitable clearance within the cylindrical recess in the port. Thus, an engine according to the present invention conveniently incorporates the invention forming the subject of the present applicant's copending application Serial No. 302,413, filed November 1, 1939.

Figure 4:
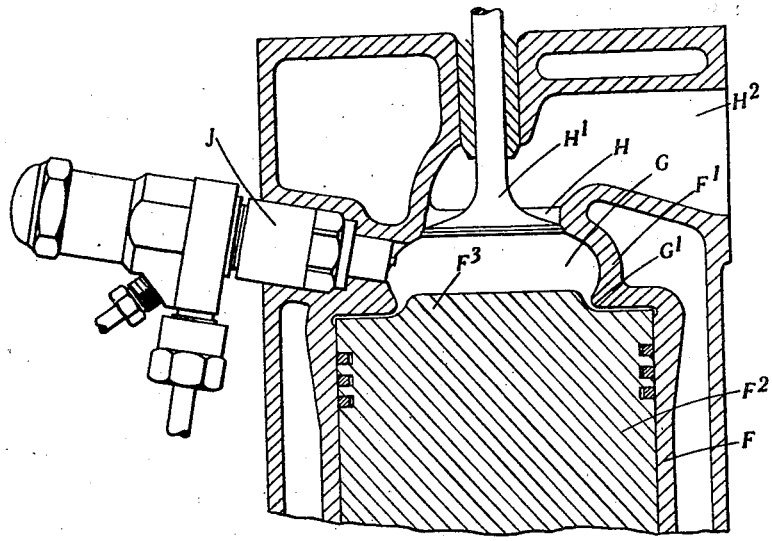

In the modified construction shown somewhat diagrammatically in Figure 4, the engine comprises a cylinder F, the head $F^1$ of which contains a combustion chamber G into which substantially the whole of the charge is forced at the end of the compression stroke by a piston $F^2$. In this construction, the combustion chamber G is of the same general contour as the combustion chamber $B^1$ shown in Figure 1, but the whole of the internal wall of the combustion chamber is formed by a part of the cylinder head, that is to say the plug $E^1$ is omitted and the heat storing lip constituting the mouth of the combustion chamber is, as shown at $G^1$, formed integral with the side wall of the combustion chamber. The combustion chamber mouth formed by the lip $G^1$ is in this construction of somewhat larger diameter than the mouth formed by the lip E in the construction shown in Figure 1 and the piston $F^2$ is provided with a projection $F^3$ which at the end of the compression stroke of the piston enters this mouth as shown.

As in the construction shown in Figure 1, the upper wall of the combustion chamber is provided with a central exhaust port H controlled by a poppet valve $H^1$ and communicating with an exhaust passage $H^2$ in the cylinder head, the valve conveniently being masked. For convenience of illustration, the fuel injector J is shown as if its axis were radial with respect to the axis of the combustion chamber. This injector will in practice, however, be arranged with its axis tangential to a circle having the axis of the combustion chamber for centre, so that the fuel is directed downstream as in the construction shown in Figures 1, 2 and 3. As will be seen, the jet axis has a slight downward inclination relatively to planes normal to the cylinder axis.

Figure 5:
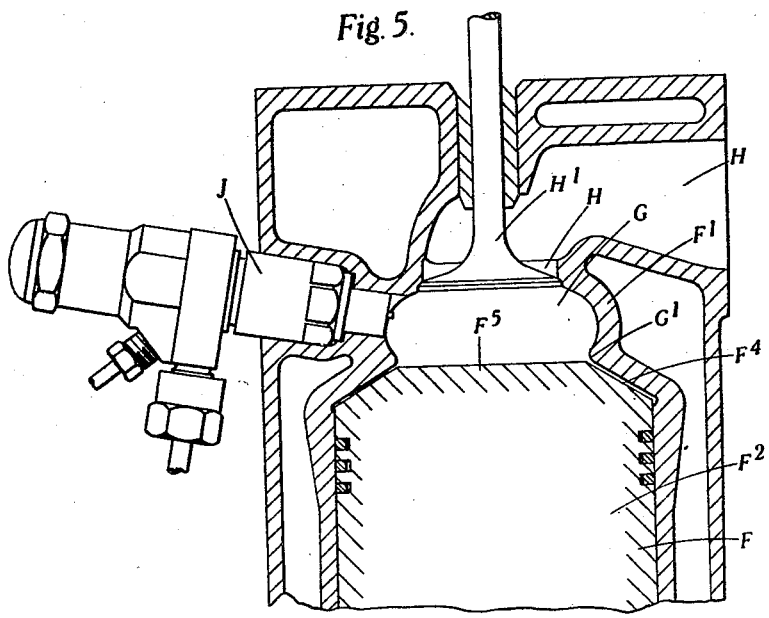

In the construction illustrated in Figure 5, the arrangement is generally similar to that illustrated in Figure 4, except that the face of the cylinder head immediately surrounding the lip or mouth $G^1$ of the combustion chamber is frusto-conical, the upper face of the piston $F^2$ being correspondingly formed frusto-conical, as shown at $F^4$, while the centre part of the piston face $F^5$ is flat and is not provided with any projection entering the mouth of the combustion chamber.

Figure 6:
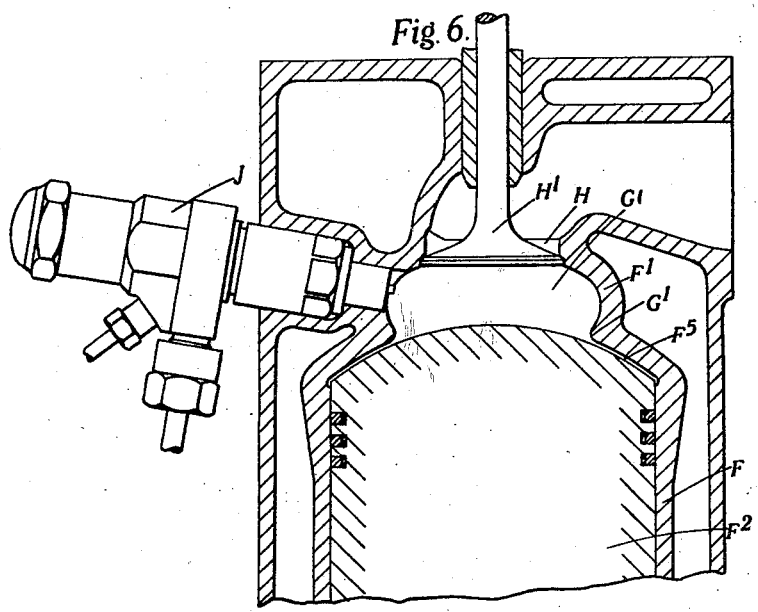

In the construction illustrated in Figure 6, the arrangement is similar to that shown in Figure 5, except that the part of the face of the cylinder head immediately surrounding the lip or mouth $G^1$ of the combustion chamber is of part-spherical form and the face of the piston $F^2$ is correspondingly part-spherical, as shown at $F^5$.

Figure 7:
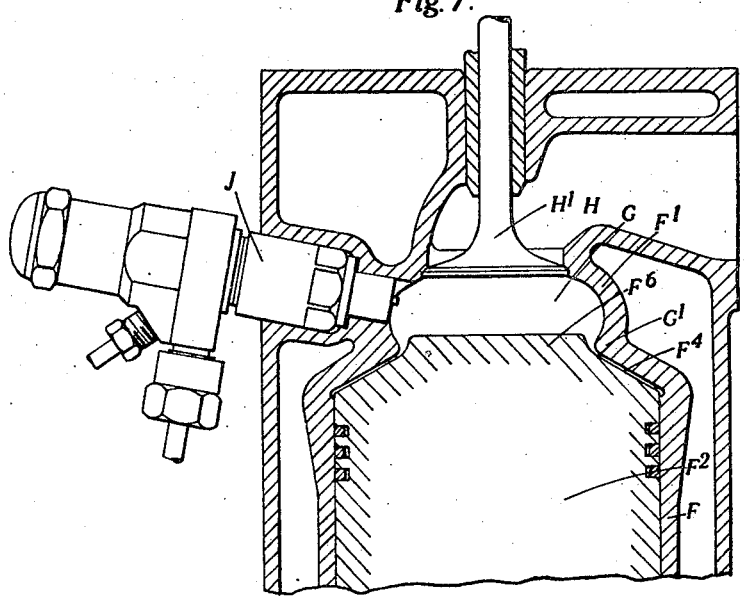

In the construction illustrated in Figure 7, the arrangement is generally similar to that shown in Figure 5, except that the part of the piston face lying within the frusto-conical portion $F^4$ is formed with a projection $F^6$ which enters the mouth of the combustion chamber at the end of the compression stroke.

What I claim as my invention and desire to secure by Letters Patent is:

1. In a two-stroke internal combustion engine operating with compression ignition, the combination of a cylinder, a piston adapted to reciprocate therein, said cylinder having tangential ports in the wall thereof controlled by said piston, a combustion chamber in the cylinder head into which at the end of the compression stroke of the piston substantially the whole of the air charge is forced, said combustion chamber being a figure of revolution about an axis which is parallel with the cylinder axis and having a depth measured in the direction of the axis of the order of one-third to one-half of the maximum diameter of the chamber, the chamber having a circular mouth concentric with the chamber axis and constituted by a passageway through which alone the chamber opens into the cylinder bore, an exhaust port with a seat for a poppet valve in the upper wall of the chamber opposite to and concentric with the mouth thereof, an inwardly directed annular flange-like heat storing lip in the said mouth giving to the latter a minimum diameter which is less than the maximum diameter of the chamber but not less than the maximum diameter of the exhaust port throat, and a fuel injector mounted in the cylinder head at the side of the combustion chamber with its nozzle in that chamber and adapted for delivering fuel along an axis tangential to a circle whose centre lies in the combustion chamber axis.

2. In a two-stroke internal combustion engine operating with compression ignition, the combination of a cylinder, a piston adapted to reciprocate therein, said cylinder having tangential ports in the wall thereof controlled by said piston, a combustion chamber in the cylinder head into which at the end of the compression stroke of the piston substantially the whole of the air charge is forced, said combustion chamber being a figure of revolution about an axis which is parallel with the cylinder axis and having a depth measured in the direction of the axis of the order of one-third to one-half of the maximum diameter of the chamber, the chamber having a circular mouth concentric with the chamber axis and constituted by a passageway through which alone the chamber opens into the cylinder bore, a plug inserted into the cylinder head concentric with the combustion chamber and having therein an opening which forms the said mouth of the chamber while the plug constitutes the wall of that part of the chamber which lies adjacent to the cylinder, the plug being held in place so that the plug has only such contact with the cylinder head as will limit heat transmission from the plug, an exhaust port with a seat for a poppet valve in the upper wall of the chamber opposite to and concentric with the mouth thereof, an inwardly directed annular flange-like lip in the said mouth as formed in the said inserted plug giving to the mouth a minimum diameter which is less than the maximum diameter of the chamber but not less than the maximum diameter of the exhaust port throat, and a fuel injector mounted in the cylinder head at the side of the combustion chamber with its nozzle in that chamber and adapted for delivering fuel along an axis tangential to a circle whose centre lies in the combustion chamber axis.

3. In a two-stroke internal combustion engine operating with compression ignition, the combination of a cylinder, a piston adapted to reciprocate therein, said cylinder having tangential ports in the wall thereof controlled by said piston, a combustion chamber in the cylinder head into which at the end of the compression stroke of the piston substantially the whole of the air charge is forced, said combustion chamber being a figure of revolution about an axis which is parallel with the cylinder axis and having a depth measured in the direction of the axis of the order of one-third to one-half of the maximum diameter of the chamber, the chamber having a circular mouth concentric with the chamber axis and constituted by a passageway through which alone the chamber opens into the cylinder bore, an exhaust port with a seat for a poppet valve in the upper wall of the chamber opposite to and concentric with the mouth thereof, an inwardly directed annular flange-like heat storing lip in the said mouth giving to the latter a minimum diameter which is less than the maximum diameter of the chamber but not less than the maximum diameter of the exhaust port throat, the piston in the cylinder having on its face a protrusion which enters the mouth of the combustion chamber at the end of the compression stroke, and a fuel injector mounted in the cylinder head at the side of the combustion chamber with its nozzle in that chamber and adapted for delivering fuel along an axis tangential to a circle whose centre lies in the combustion chamber axis.

HARRY RALPH RICARDO.